United States Patent [19]

Ishimi et al.

[11] Patent Number: 5,708,803
[45] Date of Patent: Jan. 13, 1998

[54] DATA PROCESSOR WITH CACHE MEMORY

[75] Inventors: Kouichi Ishimi; Yuichi Saito, both of Itami, Japan

[73] Assignee: Mitsubishi Denki Kabushiki Kaisha, Tokyo, Japan

[21] Appl. No.: 689,115

[22] Filed: Jul. 30, 1996

Related U.S. Application Data

[62] Division of Ser. No. 316,464, Sep. 30, 1994, abandoned.

[30] Foreign Application Priority Data

Oct. 4, 1993 [JP] Japan .................... 5-248141

[51] Int. Cl.⁶ ........................... G06F 9/00
[52] U.S. Cl. ............................... 395/580
[58] Field of Search ................... 395/580–588, 395/381

[56] References Cited

U.S. PATENT DOCUMENTS

| | | | |
|---|---|---|---|
| 4,760,519 | 7/1988 | Papworth et al. | 395/585 |
| 4,764,861 | 8/1988 | Shibiya | 395/586 |
| 4,881,170 | 11/1989 | Morisada | 395/589 |
| 4,984,154 | 1/1991 | Hanatani et al. | 395/586 |
| 5,442,756 | 8/1995 | Grochoski et al. | 395/375 |
| 5,479,622 | 12/1995 | Grohoski et al. | 395/375 |
| 5,509,137 | 4/1996 | Itonitsu et al. | 395/495 |
| 5,511,175 | 4/1996 | Favor et al. | 395/585 |

OTHER PUBLICATIONS

80960CA User's Manual, Mitsubishi Electric Corporation, Mar. 1989, B47–B49 "Computer Architecture A Quantitative Approach", Patterson, David S. et al., pp. 272–277k.

Primary Examiner—Ayaz R. Sheikh
Attorney, Agent, or Firm—Lowe, Price, LeBlanc & Becker

[57] ABSTRACT

A data processor, with high processing performance in many fields of application, having a selector 41 which enables a cache memory of direct map system to be selectively used as a built-in cache memory or a built-in RAM in order to realize a data processor which can perform high-speed processing by decreasing the number of abortions of the processing as much as possible when branch is predicted in the pipeline processing mechanism, and an FB register 61B which holds an address to be accessed so that cache memory or external storage (main storage 28) may be accessed when branch is not predicted in the pipeline processing mechanism and only a cache memory may be accessed but accessing to the main storage 28 may be prohibited when branch is predicted, wherein the main storage 28 can be accessed by the address held in the FB register 61B at the moment it becomes accessible.

4 Claims, 13 Drawing Sheets

W1: CLOCK

W2: INTERNAL ADD. BUS

W3: TAG INFORMATION

W4: DATA

W5: BUILT-IN RAM BASE ADD.

W6: PRIFETCH REQUEST SIGNAL

W7: CACHE HIT SIGNAL

W8: EXTERNAL BUS ACCESS

W9: INTERNAL DATA BUS

NCADDR REG.

NCAADDR(0:31)

0　　　　　　　　　　　　　　　　　　　　　　　　　　31

NCADDR(i)=0:ALLOWING CACHE FETCH OF
　　　　　　　INSTRUCTIONS AND DATA OF
　　　　　　　CORRESPONDING 128MB SPACE

NCADDR(i)=1:INHIBITING CACHE FETCH OF
　　　　　　　INSTRUCTIONS AND DATA OF
　　　　　　　CORRESPONDING 128MB SPACE

```
MT   :reserved
DP=0:PURGE DATA CACHE
DP=1:DON'T PURGE DATA CACHE
BP   :reserved
IP=0:PURGE INSTRUCTION CACHE
IP=1:DON'T PURGE INSTRUCTION CACHE
```

FIG. 9

BMC REG.

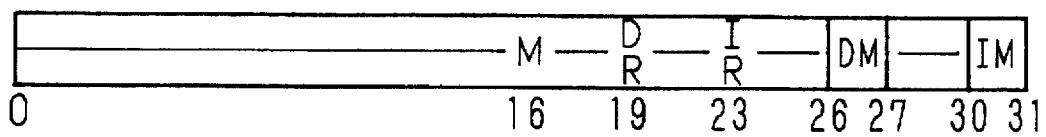

M       : reserved
DR=0   : DON'T REPLACE DATA CACHE
          (FREEZE DATA CACHE)
DR=1   : REPLACE DATA CACHE
          (DON'T FREEZE DATA CACHE)
IR=0   : DON'T REPLACE INSTRUCTION CACHE
          (FREEZE DATA CACHE)
IR=1   : REPLACE INSTRUCTION CACHE
          (DON'T FREEZE DATA CACHE)
DM=00 : DON'T OPERATE BUILT-IN MEMORY
DM=01 : OPERATE BUILT-IN MEMORY AS BUILT-IN RAM
DM=10 : OPERATE BUILT-IN MEMORY AS DATA CACHE
DM=11 : reserved
IM=00 : DON'T OPERATE INSTRUCTION CACHE
IM=01 : reserved
IM=10 : OPERATE INSTRUCTION CACHE
IM=11 : reserved

DATA PROCESSOR WITH CACHE MEMORY

This application is a division of application Ser. No. 08/316,464 filed Sep. 30, 1994 now abandoned.

BACKGROUND OF THE INVENTION

1. Field of the Invention

The present invention is related to a data processor, particularly to a type of data processor which has a built-in cache memory and a pipeline processing mechanism, and in more details, related to a technique that enables higher speed accessing of instructions and data in such a data processor.

2. Description of the Related Art

In an ordinary type of a conventional data processor, instructions and data stored in a main memory are fetched into the data processor via a system bus in order to process a program stored in the main memory. At that time, in the case where access speed to the main memory is low compared with processing time of the program in the data processor, a cache memory is often used to increase the apparent accessing speed of the main memory by decreasing the number of accessing times from the data processor to the main memory.

A cache memory is a relatively small-scale memory which comprises relatively high-speed cells, and stores the instructions and data which are once accessed and acquired by the data processor by accessing the main memory. Therefore, it is possible to use the instructions or data in a higher speed than accessing the main memory at each tim by acquiring them from the cache memory without accessing the main memory when the data processor accesses the same instructions or data again.

On the other hand, in a built-in data processor for controlling the consumer electronic equipments or industrial machines whereto electronics is greatly introduced in recent years, quantity of programs and data are relatively small. Therefore, it is designed to have built-in RAMs and ROMs which store programs and data for fast accessing.

For example, in the 16-bit microcomputer M37700M2-XXXFP manufactured by Mitsubishi Electric Corporation disclosed in it user's manual (March, 1989), a built-in RAM is allocated to addresses "$007F_{16}$" to "$027F_{16}$" and a built-in ROM to addresses "$C000_{16}$" to "$FFFF_{16}$" on the memory map respectively. Here, "$_{16}$" means hexadecimal notation. The built-in RAM is mainly used to store data and as a stack area for subroutine callings and interrupts, and the built-in ROM is mainly used to store programs.

In such a small-scale system as mentioned above, the cache memory cannot be fully utilized, but an explicitly operable built-in RAM is more effective than it for better system performance.

On the other hand, in a relatively large-scale system, a vast memory space is used, therefore the capacity of the built-in RAM is not enough to store data to be processed. Consequently, the built-in memory is often used as the cache memory to improve the performance of the entire system by the small capacity of the built-in memory.

Thus, there are two cases where using the built-in memory as the cache memory is more effective and using it as the built-in data RAM, depending on the purpose of the data processor. Consequently, a conventional data processor has either a built-in cache memory or a built-in RAM according to the purpose.

A recent ordinary data processor has pipeline processing mechanism, wherein a plurality of instructions are executed in parallel in an internal pipeline stage to improve the performance. The advantage of the pipeline processing is that a series of processings from fetching an instruction from the main memory, the instruction execution, and storing the result of the instruction execution in the main memory is divided into several functional blocks and simultaneously performed, therefore it is shown that several instructions are executed in parallel and thus performance is improved. However, not all the instructions which are executed by the data processors provided with a pipeline processing mechanism can be executed in parallel. For example, when a conditional branch instruction is to be processed, it is not decided which instruction must be fetched into the pipeline next until the branch instruction is executed and so parallel processing is impossible.

To cope with this problem, when a conditional branch instruction is fetched into the pipeline, such a method is adopted that it is predicted whether the branch instruction actually branches or not, and when branching, it is predicted to which instruction it is branched (branch prediction) and the subsequent instruction is fetched. However, a branching may not take place to the predicted instruction; and when an external device such as memory is accessed in accordance with a wrong prediction, an inaccessible address, for example, whereto hardware such as memory is not connected may be accessed. In such a case, response time may be made longer leading to aggravating the performance. For this reason, necessary that processing was aborted at the time when an instruction was taken in during branch prediction or the instruction taken in the pipeline was going to access an external unit such as memory, and then the processing was resumed after the branch instruction was executed properly to prove the branch prediction to be correct.

In the general-purpose data processors, which of built-in cache memory and built-in RAM is effective for improving the system depends on applications. When a data processor having only a built-in cache memory is used for a system which is suitable for a relatively small-scale built-in RAM, the memory space used is small; therefore a waste of region may be generated in the cache in a high probability and so using an explicitly operable built-in RAM is more advantageous for improving the system performance. On the other hand, in a system where a relatively large memory space is handled, the memory space used is vast; therefore the capacity of the built-in RAM is insufficient and so the instructions and data must be frequently changed in the built-in RAM to utilize it efficiently. Thus, a heavy load is imposed on the program and related processing is necessary, therefore provision of the built-in cache memory is made advantageous for performance improvement.

When the data processor has both a built-in cache memory and a built-in RAM, the capacity of each of them is reduced to one half of each one's own capacity compared with that in the case where either one of them is used assuming that their hardware capacities usable for memory are the same.

In a data processor wherein pipeline processing is performed, when an instruction or data of not yet undefined an address is to be accessed during the time from the moment a branch is predicted to the moment it is assured, processing is aborted and the parallel processing of the pipeline processing cannot be done. Thus, the performance of the data processor is aggravated.

SUMMARY OF THE INVENTION

The present invention has been devised to solve the above stated problems, and an object thereof is to provide a data processor with high performance in processing can be realized in many fields of application.

Another object of the invention is to provide a data processor, with pipeline processing mechanism, capable of processing quickly by lessening the number of abortions even when a branch prediction is performed.

The present invention comprises mainly two inventions as described below.

First invention: The data processor is provided with a cache memory of direct map system, and is provided with switching means which can selectively switch the cache memory to a built-in cache memory or a built-in RAM. It also has bus snoop function which functions only when the data processor operates as the built-in cache memory.

Second invention: not under a branch prediction in the pipeline processing mechanism, the cache memory or external storage is accessed. under a branch prediction, only the cache memory is accessed and the external storage cannot be accessed. Address holding means for holding an address to be accessed is provided, and at the time when accessing to the external storage is made possible, the external storage can be accessed by the address held in the address holding means.

In the first invention stated above, the cache memory operates as the built-in cache memory or the built-in RAM by the switching means. When it operates as the built-in cache memory, the bus snoop function also operates.

In the second invention stated above, accessing to the external storage is prohibited under a branch prediction. At the moment branch prediction is proved to be correct and access to the external storage is made possible, the external storage is accessed by the address held in the address holding means.

The above and further objects and features of the invention will more fully be apparent from the following detailed description with accompanying drawings.

BRIEF DESCRIPTION OF THE DRAWINGS

FIG. 9 is a schematic diagram showing the fields and their meanings of a BMC register;

DESCRIPTION OF THE PREFERRED EMBODIMENTS

The present invention will be described in details with reference to the drawings showing the embodiments thereof.

Figure 1:
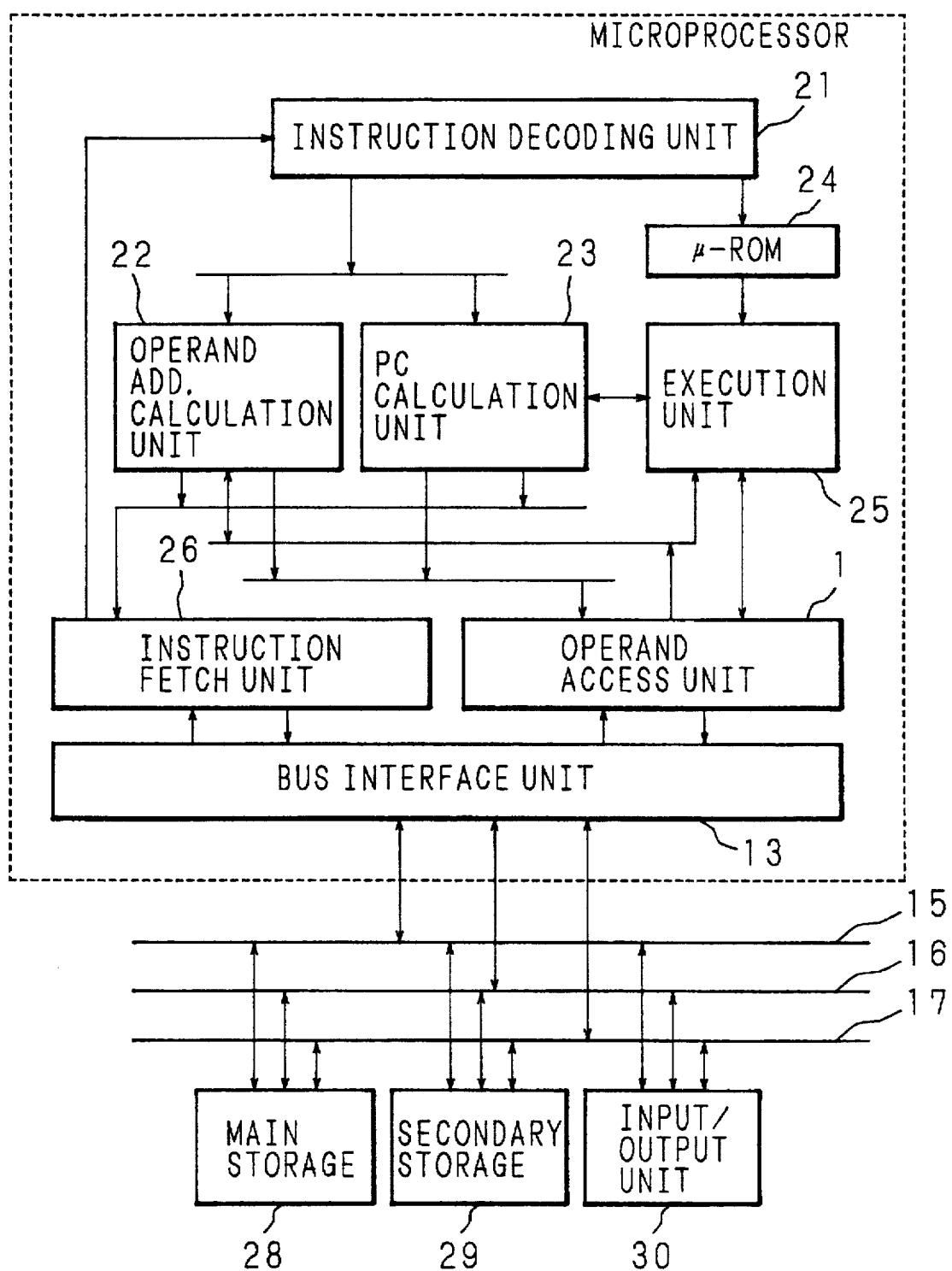
FIG. 1 is a block diagram showing a configuration of a 32-bit microprocessor and its peripheral circuits of the data processor as an embodiment of the present invention.

FIG. 1 is a block diagram showing a configuration of a 32-bit microprocessor and its peripheral circuits of the data processor as an embodiment of the present invention.

The inside of the microprocessor can be roughly divided, with respect to its-functions, into an instruction decoding unit 21, an operand address calculation unit 22, a PC calculation unit 23, a micro-ROM 24, an execution unit 25, an instruction fetch unit 26, an operand access unit 1, a bus interface unit 13 and the like.

The bus interface unit 13 is connected to a main storage (main memory) 28, a secondary storage 29 and another input/output unit (such as keyboard, a display, a printer, etc.) 30 via an external address bus 15 of 32-bit width, an external data bus 16 of 32-bit width and an external control signal line 17. Each of the instruction fetch unit 26 and operand access unit 1 have a built-in cache memory independently.

Figure 2:
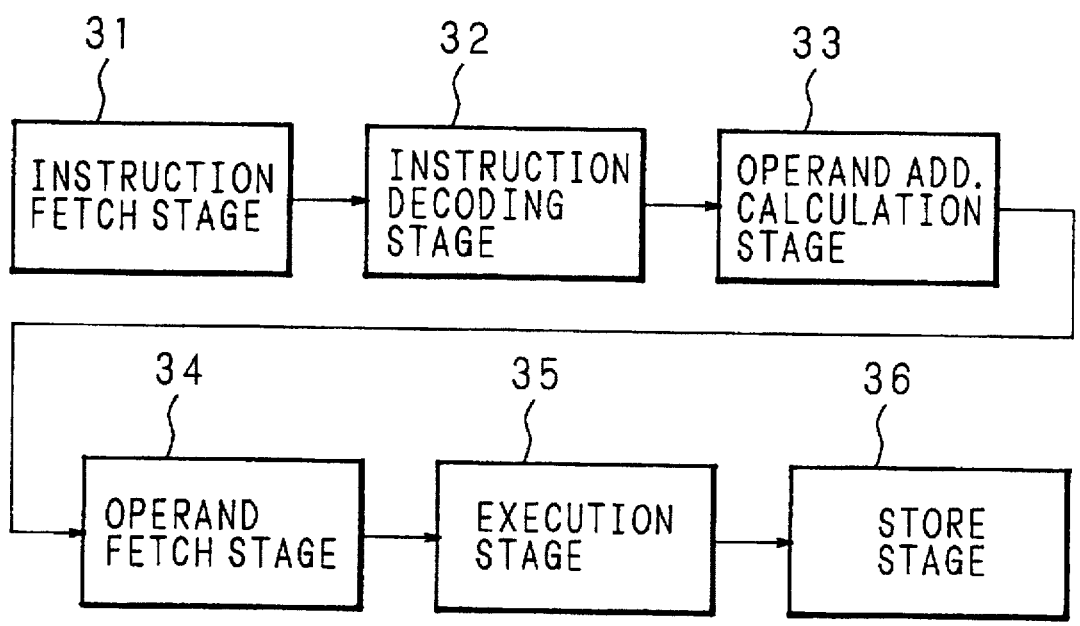
FIG. 2 is a schematic diagram showing six-stage pipeline processing mechanism of the data processor of the present invention.

The microprocessor of the embodiment, performs pipeline processing of six stages as shown by the schematic diagram in FIG. 2.

Concretely, the pipeline of the microprocessor in the present embodiment comprises, from the upstream to the downstream, six stages: an instruction fetch stage 31, an instruction decoding stage 32, an operand address calculation stage 33, an operand fetch stage 34, an execution stage 35 and a store stage 36.

Figure 3:
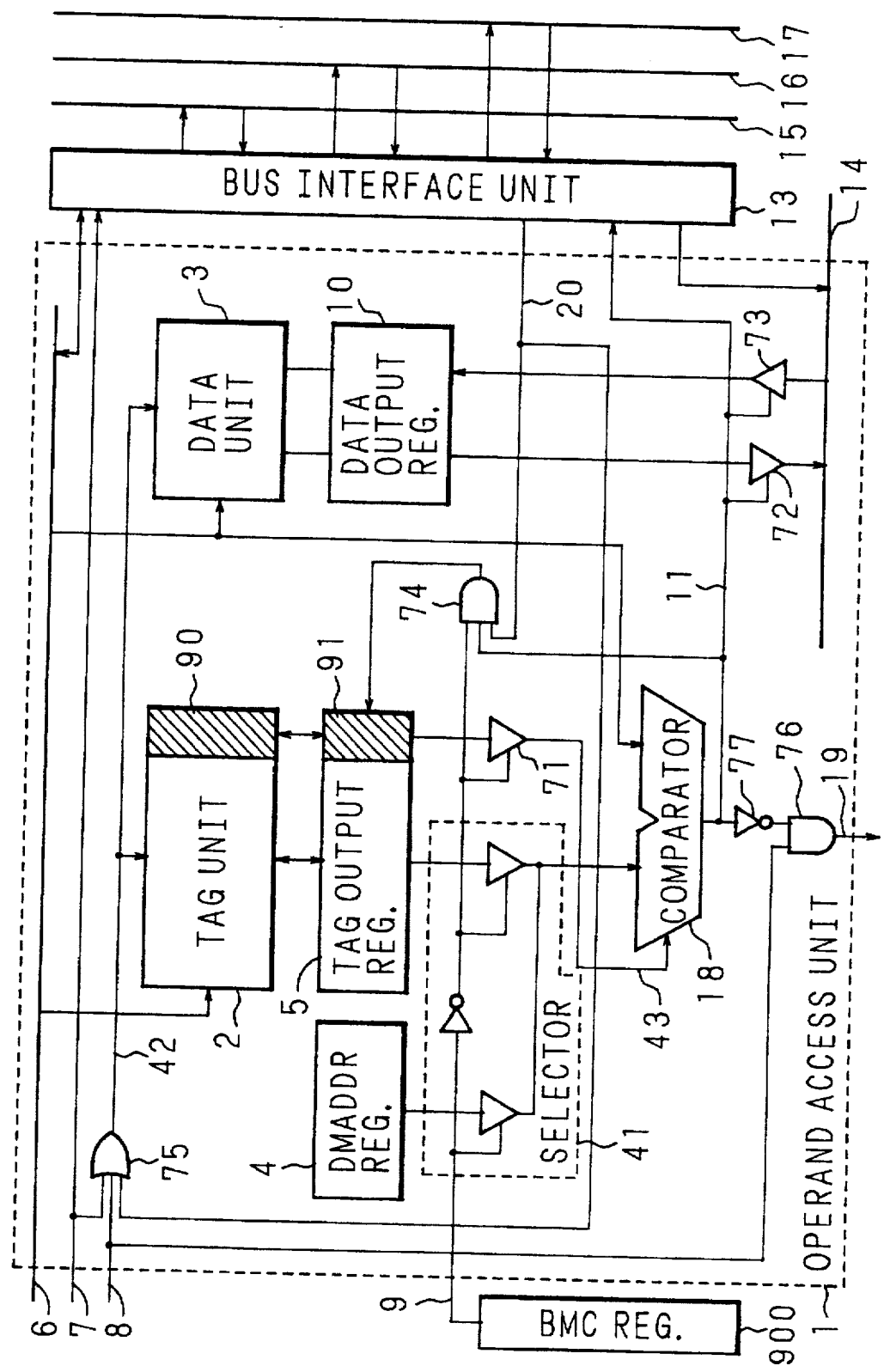
FIG. 3 is a block diagram showing a configuration of an operand accessing unit built in a cache memory of the data processor of the present invention.
Figure 4:
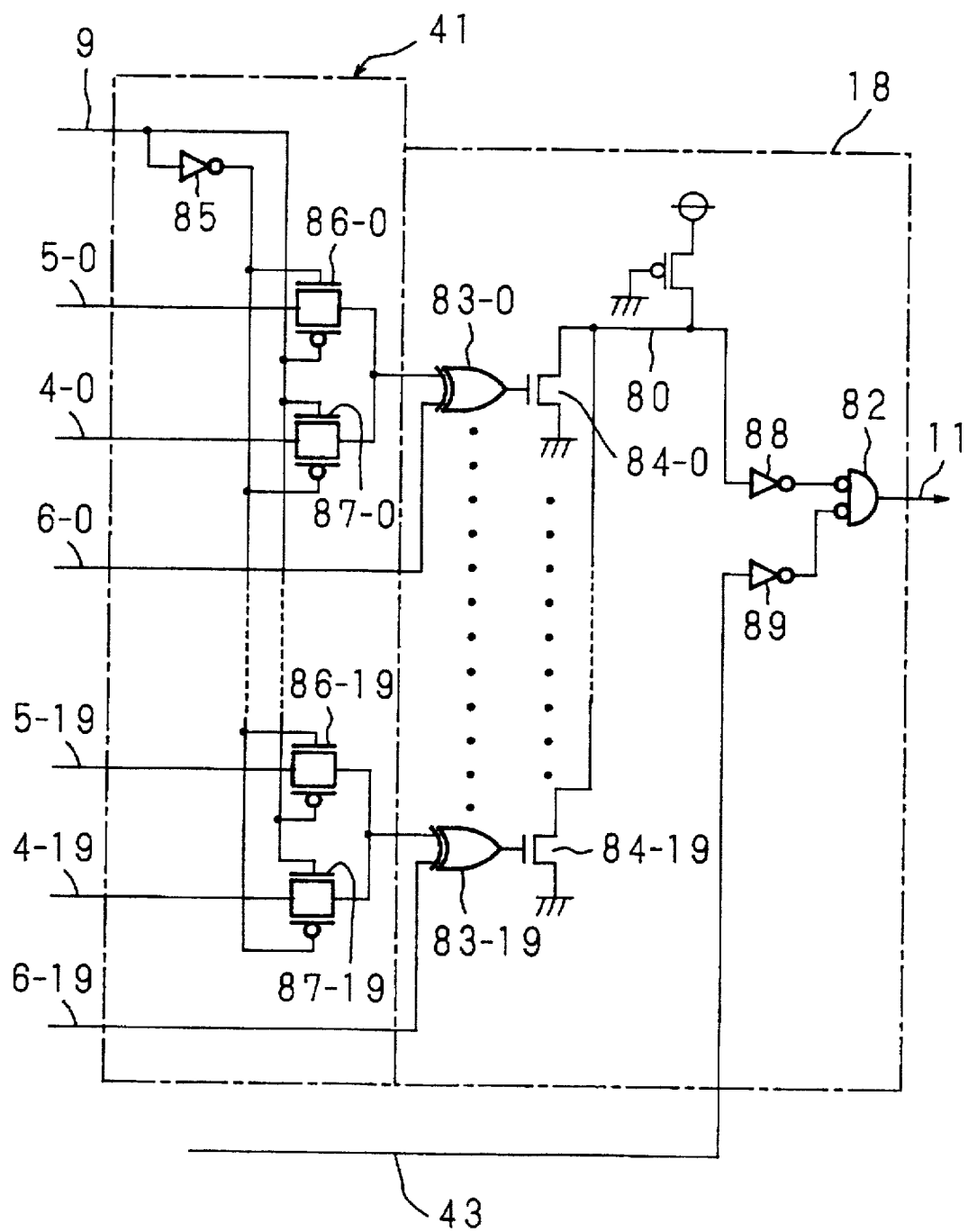
FIG. 4 is a circuit diagram showing an example of circuit configuration in regard of switching between built-in cache mode and built-in RAM mode and a generation of a cache hit signal of the data processor of the present invention.
Figure 5:
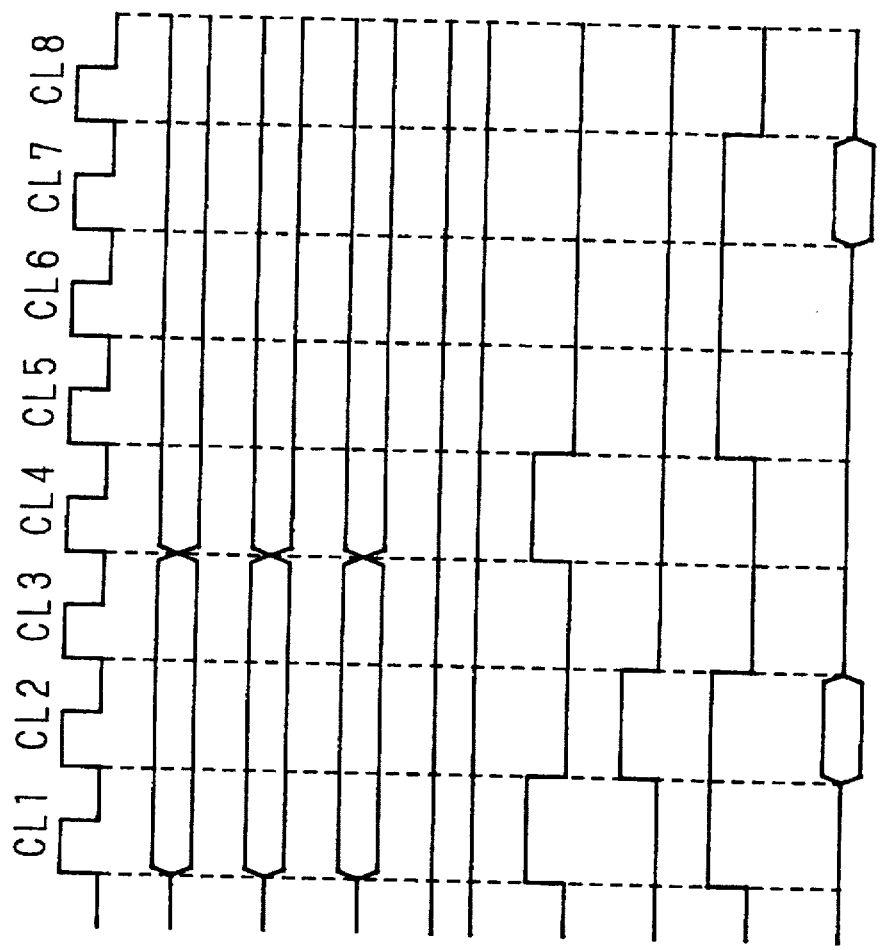
FIG. 5 is a timing chart at the time of cache accessing of the data processor of the present invention.

The program is at first fetched from the main storage 28 into the pipeline at the instruction fetch stage 31 and then its instruction code is decoded in the subsequent stage of the instruction decoding stage 32. When the decoded instruction is a conditional branch instruction, a branch prediction is performed in the instruction decoding stage 32 and the next instruction is fetched into the pipeline from the predicted branch destination. When the instruction having been decoded in instruction decoding stage 32 has an operand, the address of the operand is calculated in the operand address calculation stage 33. When data fetch from the memory is accompanied, it is fetched in the subsequent stage of operand fetch stage 34. Then the instruction is executed in the execution stage 35. When it is necessary to store execution result, it is stored in the memory such as main storage 28 by the store stage FIG. 3 is a block diagram showing a configuration of the operand access unit 1 building in a cache memory of the microprocessor of an embodiment of the present invention. FIG. 4 is a circuit diagram showing a configuration example of a circuit with respect to switching between a built-in cache mode and a built-in RAM mode and a generation of a cache hit signal. FIG. 5 is a timing chart at the time of cache accessing.

In FIG. 3, reference numerals 2, 3 and 90 indicate a tag unit, a data unit and a valid bit unit, respectively, of the built-in cache memory of the operand access unit 1 of an embodiment of the present invention.

The data unit 3 has a capacity of 4K bytes. When the value of a built-in memory mode signal 9 determined by the value of a DM bit of a BMC register 900 (see FIG. 9) described later is "0" or "1", it is switched to a built-in cache mode under which it is operating as a built-in cache memory of direct map system or a built-in RAM mode under which it is operating as a built-in RAM, respectively. Under the built-in cache mode, it can store 256 entry data containing a block comprising 20 bits in tag unit 2, 1 bit in valid bit unit 90, and 16 bytes in data unit 3. When data stored in the cache memory is updated, data stored in the corresponding external memory is simultaneously updated by write-through system.

Switching between the built-in cache mode and a built-in RAM mode stated above is performed by a selector 41 described later.

Reference numeral 4 indicates a DMADDR register which stores a RAM base address of 20-bits which is a base address in the memory space whereto the built-in RAM is allocated under the built-in RAM mode as described later. The built-in RAM base address stored in the DMADDR register 4 is outputted to the selector 41. An arbitrary value of the built-in RAM base address can be stored in the DMADDR register 4 by an instruction.

Reference numeral 5 indicates a tag output register which temporarily holds a tag information outputted from the tag unit 2 and composed of 20 bits as same as the tag unit 2. Reference numeral 91 indicates a valid bit register which temporarily holds the value of the valid bit outputted from the valid bit unit 90 and composed of 1 bit as same as the valid bit unit 90.

The tag information held in the tag output register 5 is outputted to the selector 41 and the value of the valid bit held in the valid bit register 91 is outputted to a gate 71. In addition, when the built-in memory mode signal 9 is "0", that is, under the built-in cache mode, the gate 71 is open and outputs the Value of the valid bit to a comparator 18 as a valid signal 43.

Reference numeral 10 indicates a data output register which temporarily holds data read from the entry of the data unit 3 corresponding to the address given from the internal address bus 6. The data output register 10 has an output route connected to an internal data bus 14 via a gate 72. The gate 72 is open when a cache hit signal 11 is outputted from the abovementioned comparator 18 (the value of the cache hit signal 11 is "1"), and outputs the data held in the data output register 10 to the internal data bus 14.

The data output register 10 also has an input route connected to the internal data bus 14 via a gate 73. The gate 73 is open when the cache hit signal 11 is outputted from the comparator 18, and outputs the data on the internal data bus 14 to the data output register 10.

Reference numeral 74 indicates a three-input AND gate whereto the built-in memory mode signal 9, the cache hit signal 11 and a bus snoop signal 20 described later are inputted. When all of three inputs of the AND gate 74 are "1", its output signal becomes "1" to clear the contents of the valid bit register 91 to "0".

Reference numeral 75 indicates a three-input OR gate whereto a first prefetch request signal 7, a second prefetch request signal 8 both described later and the bus snoop signal 20 are inputted; and its output signal is given to the tag unit 2 and the data unit 3 as a cache read signal 42. When an address is given from the internal address bus 6 while the cache read signal 42 is being given (the value of the cache read signal 42 is "1"), from the corresponding entry of the tag unit 2, valid bit unit 90 and the data unit 3, a tag information is outputted to the tag output register 5 a valid bit is outputted to the valid bit register 91, and data is outputted to the data output register 10 respectively.

Reference numeral 77 indicates an inverter which inverts the cache hit signal 11 outputted from the comparator 18 and inputs it to an AND gate 76. To the AND gate 76, the second prefetch request signal 8 is inputted in addition to the output signal from the inverter 77 and its output signal is inputted to the operand fetch stage 34 as a prefetch stop signal 19.

Consequently, the prefetch stop signal 19 becomes "1" when the cache hit signal 11 is "0" and the second prefetch request signal 8 is "1".

Next, referring to FIG. 4, explanation of a circuit for switching between the built-in cache mode and the built-in RAM mode and the generation of the cache hit signal 11, concretely, the selector 41 and the comparator 18 will be given.

To the selector 41, the built-in memory mode signal 9, each bit (hereafter each to be referred 4-0, 4-1 ... 4-19) of the built-in RAM base address of 20-bit held in the DMADDR register 4, each bit (hereafter each to be referred 5-0, 5-1 ... 5-19) of the tag output register 5 of 20-bit, and higher 20 bits (hereafter to be referred 6-0, 6-1 ... 6-19) of the fetch address inputted from the internal address bus 6. Each of the bits 4-0, 4-1 ... 4-19 of the built-in RAM base address is inputted to one input terminal of each of EXOR gates 83-0, 83-1 ... 83-19 via each of transfer gates 87-0, 87-1 ... 87-19. Each of the bits 5-0, 5-1 ... 5-19 of the tag output register 5 is inputted to one input terminal of each of the EXOR gates 83-0, 83-1 ... 83-19 via each of transfer gates 86-0, 86-1 ... 86-19. The higher 20 bits 6-0, 6-1 ... 6-19 of the fetch address are inputted to the other input terminals of the EXOR gates 83-0, 83-1 ... 83-19, respectively.

In FIG. 4, reference numeral 85 indicates an inverter which inverts the built-in memory mode signal 9 and outputs it.

The above stated transfer gates 86-0, 86-1 ... 86-19 and 87-0, 87-1 ... 87-19 are controlled to open and close by the built-in memory mode signal 9 and its inverted signal by the inverter 85. Concretely, when the built-in memory mode signal 9 is "0", the transfer gates 86-0, 86-1 ... 86-19 are open and output the bits 5-0, 5-1 ... 5-19 of the tag output register 5, and input each of them to the one input terminal of each of the EXOR gates 83-0, 83-1 ... 83-19. When the built-in memory mode signal 9 is "1", the transfer gates 87-0, 87-1 ... 87-19 are open and output bits 4-0, 4-1 ... 4-19 of the built-in RAM base address and input each of them to the one input terminal of each of the EXOR gates 83-9, 83-1 ... 83-19.

Consequently, when the built-in memory mode signal 9 is "0", the higher 20 bits 6-0, 6-1 ... 6-19 of the fetch address are compared with the corresponding bits 5-0, 5-1 ... 5-19 of the tag output register 5, respectively, by the EXOR gates 83-0, 83-1 ... 83-19. When their values are equal, the output signals of the EXOR gates 83-0, 83-1 ... 83-19 are "0" respectively. When the built-in memory mode signal 9 is "1", the higher 20 bits 6-0, 6-1 ... 6-19 of the fetch address are compared with the corresponding bits 4-0, 4-1 ... 4-19 of the built-in RAM base address at the EXOR gates 83-0, 83-1 ... 83-19. When their values are equal, the output signals of the EXOR gates 83-0, 83-1 ... 83-19 are "0", respectively.

In the comparator 18, an inverter 88 whose input terminal is connected to a pulled-up signal line 80, an AND gate 82 of two negative logic inputs wherein the output signal of the inverter 88 is inputted to one of them, transistors 84-0, 84-1 ... 84-19 to whose gates the output signals of the above stated EXOR gates 83-0, 83-1 ... 83-19 are inputted, and an inverter 89 whereto the valid signal 43 which is the output signal of the gate 71 shown in FIG. 3 is inputted, besides the above stated EXOR gates 83-0, 83-1 ... 83-19. The output signal of the inverter 89 is inputted to the other input terminal of the AND gate 82.

The sources of the transistors 84-0, 84-1 ... 84-19 are connected to the abovementioned signal line 80 and their drains are grounded. Consequently, when two inputs to any one of the EXOR gates 83-0, 83-1 ... 83-19 are not coincident, the output signal becomes "1" and signal line 80 is grounded by one of transistors 84-0, 84-1 ... 84-19. Thus, input signal to the inverter 88 becomes "0" and its output signal becomes "1". Therefore the cache hit signal 11 which is the output signal of the AND gate 82 becomes "0".

On the other hand, when two inputs of all of the EXOR gates 83-0, 83-1 ... 83-19 are coincident, their output signals become "0" and the signal line 80 is not grounded by any of the transistors 84-0, 84-1 ... 84-19. Therefore, the input signal to the inverter 88 becomes "1" and its output signal becomes "0". When valid signal 43 is "1", because both inputs to the AND gate 82 become "0", the cache hit signal 11 which is the output signal of the AND gate 82 becomes "1".

When the two inputs to any one of the EXOR gates 83-0, 83-1 ... 83-19 are not coincident and the built-in memory mode signal 9 is "0", any one of the higher 20 bits 6-0, 6-1 ... 6-19 of the fetch address is not equal to the corresponding bit 5-0, 5-1 ... 5-19 of the tag output register 5. This means that cache miss occurs. When the built-in memory mode signal 9 is "1", any one of the higher 20 bits 6-0, 6-1 ... 6-19 of the fetch address is not equal to the corresponding bit 4-0, 4-1 ... 4-19 of the built-in RAM base address. This means the built-in RAM is not to be accessed.

FIG. 6 to FIG. 9 are schematic diagrams showing a part of a field and its meaning of registers related to the cache memory.

Figure 6:
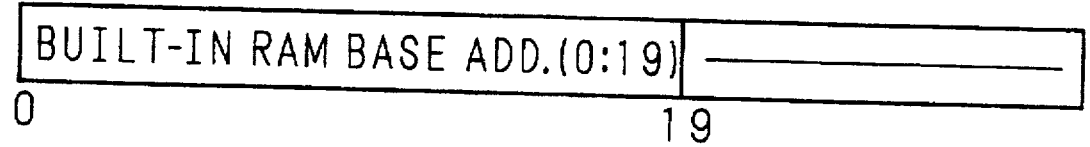
FIG. 6 is a schematic diagram showing fields and their meanings of a DMADDR register.

The DMADDR register shown in FIG. 6 is indicated by reference numeral 4 in FIG. 3. It stores the built-in RAM base address of 20 bits which is the base address for a memory space to which the built-in RAM is allocated under the built-in RAM mode.

Figure 7:
FIG. 7 is a schematic diagram showing fields and their meanings of an NCADDR register.

Each bit of the NCADDR register shown in FIG. 7 divides a 4G-byte memory space into 32 numbers of 128M-byte address spaces and specifies inhibition of cache fetch of each address space corresponding to them.

Figure 8:
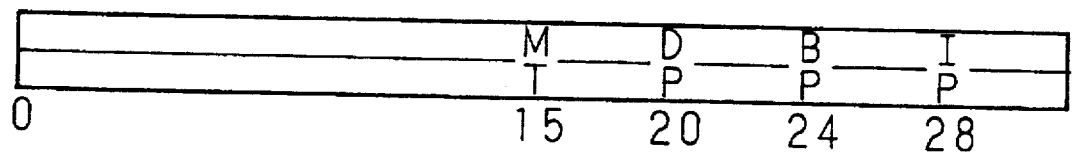
FIG. 8 is a schematic diagram showing fields and their meanings of a BMP register.

A BMP register shown in FIG. 8 specifies cache purge. By setting "1" in a DP bit (bit 20) or in an IP bit (bit 28), the data cache or the instruction cache is purged, respectively.

A BMC register shown in FIG. 9 controls the operational modes and replacement of the cache. The built-in memory mode signal 9 is generated in accordance with the values of bits 26 and 27 (DM) of the BMC register.

The operations performed under the built-in cache mode (DM=10: the built-in memory mode signal 9 is "0") will be described with referring to FIG. 5 as follows.

In the timing chart shown in FIG. 5, waveform W1 indicates the internal clock of the data processor related to the present invention, waveform W2 indicates an address on the internal address bus 6, waveform W3 indicates tag information outputted from the tag unit 2, waveform W4 indicates data outputted from the data unit 3, waveform W5 indicates built-in base address outputted from the DMADDR register 4, waveform W6 indicates the first prefetch request signal 7 or the second prefetch request signal 8, waveform W7 indicates the cache hit signal 11, waveform W8 indicates a signal for accessing an external bus, and waveform W9 indicates data on the internal data bus 14.

In the clock CL1, when either the first prefetch request signal 7 or the second prefetch request signal 8 is "1" and an address value is inputted into the internal address bus 6, the lower 8 bits of the address value are decoded and any one of 256 entries is specified, and tag information stored in the tag unit 2 corresponding to the specified entry is outputted to the tag output register 5, the valid bit stored in the valid bit unit 90 is outputted to the valid bit register 91, and data stored in the data unit 3 is outputted to the data output register 10. In this case, since the built-in memory mode signal 9 is "0", the value of the tag output register 5 and the high 20 bits of the fetch address 6 are inputted to the comparator 18. When both inputs to the comparator 18 are coincident and the valid bit is "1", the cache hit signal 11 is outputted in the clock CL2.

When fetch access makes a cache hit as stated above, the gate 72 is open, therefore data which has been outputted from the data unit 3 and held in the data output register 10 is outputted to the internal data bus 14. In case of data storing, the gate 73 is open, therefore the value on the internal data bus 14 is written in the corresponding entry of the data unit 3 via the data output register 10. Further, since data in the external memory must be rewritten, a write request is outputted to the bus interface unit 13.

On the other hand, when data fetch begins in the clock CL4 but a cache miss has occurred, an external bus accessing becomes effective and data is fetched from the external data bus 16 to the internal data bus 14 in clock CL7.

On the other hand, under the built-in RAM mode (DM=01), the built-in memory mode signal 9 is "1", therefore bits 4-0, 4-1 ... 4-19 of the built-in RAM base address held in the DMADDR register 4 are compared with the higher 20 bits 6-0, 6-1 ... 6-19 of the fetch address, respectively, by the comparator 18. When all the bit pairs are coincident, the cache hit signal 11 is outputted in the same manner as under the built-in cache mode. Since the corresponding data has been outputted from the data unit 3 and is held in the data output register 10 at the time when a fetch address is given from the internal address bus 6, data is outputted from the data output register 10 to the internal data bus 14 in case of data fetching and the cache is hit or the value on the internal data bus 14 is written in the corresponding entry of the data unit 3 in case of data storing. In this case, a write request is not outputted to the bus interface unit 13.

In a system wherein a plurality of microprocessors are connected, when data in the built-in cache memory in a microprocessor is rewritten, the same regions of the built-in cache memories of the other microprocessors must be rewritten or invalidated at the same time when data is rewritten in external memory. For this purpose, a microprocessor building in a cache memory always monitors external addresses, and it invalidates the pertinent region in the cache memory, when the other data processor writes data in the region which is read into cache memory. This function is called a bus snoop function.

Note it is used as a working register dedicated to each microprocessor for built-in RAM, it is not the subject of bus snoop.

In a configuration wherein a plurality of microprocessors are connected to an external unit such as the main storage 28 via a common external address bus 15, a common external data bus 16 and a common external control signal line 17 as stated above, the right which the individual data processors have for accessing the external unit via external data bus 16 is called a bus right. In the case where the data processor related to the present invention releases the bus right, that is, it yields the right to use the external data bus 16 to the other unit; when the bus interface unit 13 detects that the other data processor is rewriting data in an external unit (e.g., main storage 28) via the external data bus 16 by the states of memory write signal and data strobe signal (indicating effective signal is outputted to the external data bus 16) outputted to the external control signal line 17, the bus interface unit 13 sets the bus snoop signal 20 to "1" and, at the same time, outputs data on the external address bus 15 to the internal address bus 6.

In the same way as the case of operand fetch, when the higher 20 bits of the value of the tag output register 5 and the internal address bus 6 coincide with each other and the valid bit register 91 is "1", the cache hit signal 11 is outputted. At this time, when the bus snoop signal 20 is "1" and under the built-in cache mode (the built-in memory mode signal is "0"), the contents of the valid bit register 91 is set to "0" by the signal outputted from the AND gate 74 and then it is sent to the valid bit unit 90 to set the corresponding valid bit to "0". That is, the corresponding data in the data unit 3 is invalidated.

The embodiment of the present invention comprises the built-in cache memory system of a conventional direct map method, the circuit shown in FIG. 4, and a circuit which selects whether or not to output a write request to the external bus when data storing. However in the other embodiment, the built-in memory is accessed via a circuit independent from the built-in cache memory under the built-in the RAM mode, or the address of the built-in RAM is written in tag unit 2 under the built-in RAM mode. In this case, a part of the built-in memory can be used as a built-in RAM and the other part of it can be used as a built-in cache memory.

Next, a fetch retry mechanism is explained.

Figure 10:
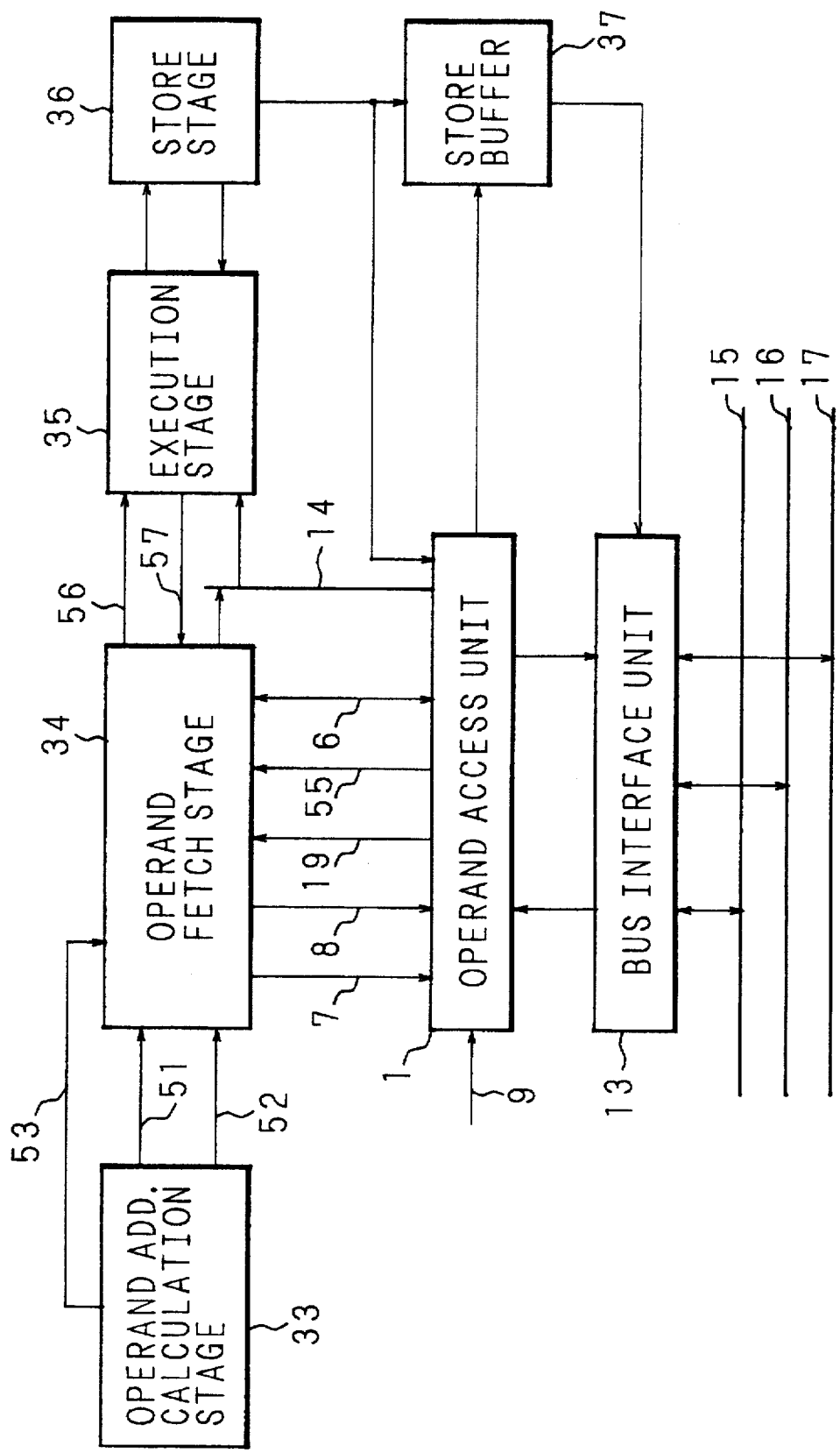
FIG. 10 is a schematic diagram showing signals transmitted and received between an operand fetch stage and its preceding and subsequent stages, and transmitted and received between the operand fetch stage and an operand access unit of the data processor of the present invention.
Figure 11:
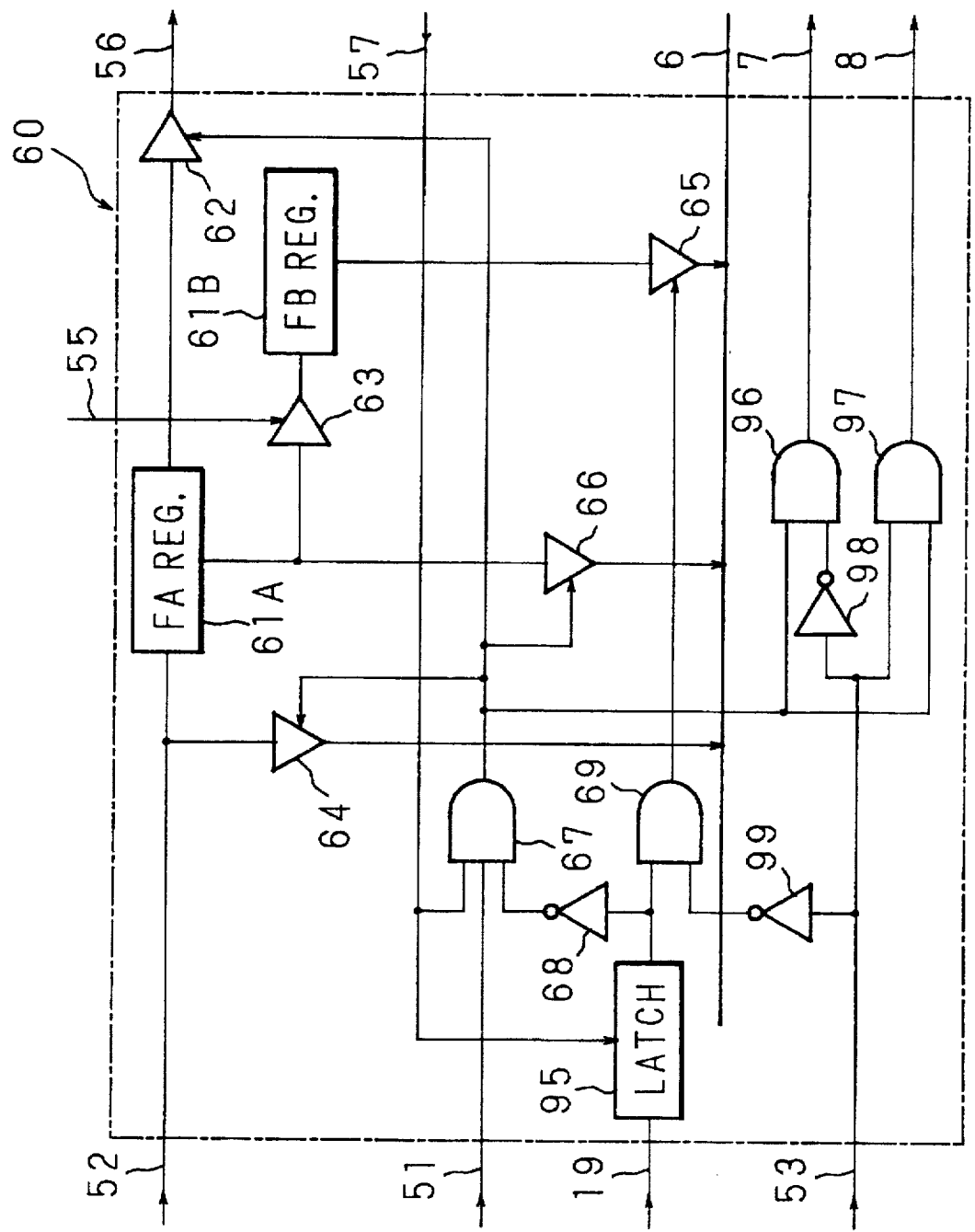
FIG. 11 is a circuit diagram showing a configuration example of a fetch retry mechanism located in the operand fetch stage.

FIG. 10 is a schematic diagram showing signals transmitted between the operand fetch stage 34 of a 32-bit microprocessor as the data processor related to the present invention and its preceding and subsequent stages, and those transmitted between the operand fetch stage 34 and the operand access unit 1. The operand fetch stage 34 is a conceptual stage of the pipeline processing, however, hardware and software necessary for operand fetching except for the operand access unit 1 are shown collectively. FIG. 11 is a circuit diagram as an example of a configuration of a fetch retry mechanism 60 located in the operand fetch stage 34.

To the operand fetch stage 34, a branch prediction signal 53, a prefetch request signal 51 and an operand address 52 are given from the operand address calculation stage 33, the fetch request signal 57 is given from the execution stage 35, and a prefetch stop signal 19 and an acknowledge signal 55 are given from the operand access unit 1. From the operand fetch stage 34, an address value 56 is given to the execution stage 35, and the first prefetch request signal 7 and the second prefetch request signal 8 are given to the operand access unit 1.

Reference numeral 37 indicates a store buffer which is used when data is stored by the store stage 36.

The prefetch request signal 51 given from the operand address calculation stage 33 to the operand fetch stage 34, and the first prefetch request signal 7 and the second prefetch request signal 8 given from the operand fetch stage 34 to the operand access unit 1 are the signals for specifying operand prefetch. The fetch request signal 57 given from the execution stage 35 to the operand fetch stage 34 is the signal for specifying the next instruction.

As shown in FIG. 11, the fetch retry mechanism 60 located in the operand fetch stage 34 of the microprocessor as an embodiment of the data processor related to the present invention has two registers: an FA register 61A and an FB register 61B.

The FA register 61A holds the operand address 52 given from the operand address calculation stage 33 and outputs it as the address value 56 to the execution stage 35 via the gate 62. The operand address 52 is outputted to the internal address bus 6 via a gate 64.

The gates 62 and 64 are open when an output signal of an AND gate 67 stated later is "1".

An output from the FA register 61A is inputted to the FB register 61B via a gate 63. It is open when the acknowledge signal 55 given from the operand access unit 1 is "1" so that the FB register 61B can hold an operand address which the FA register 61A holds.

An operand address held in the FB register 61B is outputted to the internal address bus 6 via a gate 65. The gate 65 is open when an output signal of an AND gate 69 described later is "1".

An operand address held in the FA register 61A is outputted to the internal address bus 6 via a gate 66. The gate 66 is open when an output signal of an AND gate 67 above described is "1".

Consequently, the operand address 52 inputted from the operand address calculation stage 33 to the operand fetch stage 34 is outputted to the internal address bus 6 via one of the following three routes (1) gate 64, (2) gate 66 after being held in the FA register 61A, or (3) gate 65 after being held in the FB register 61B via gate 63 from the FA register 61A and then given to the operand access unit 1. It is also outputted to the execution stage 35 as the address 56 from the FA register 61A via the gate 62.

The AND gate 67 is of three inputs and receives the fetch request signal 57 outputted from the execution stage 35, the prefetch request signal 51 outputted from the operand address calculation stage 33, and an output signal of an inverter 68. An input signal to the inverter 68 is an output signal from a latch 95 which latches prefetch stop signal 19 outputted from the operand access unit 1. The latch 95 is cleared when the fetch request signal 57 is set to "1".

Thus, when the fetch request signal 57 and the prefetch request signal 51 are "1" (valid) and the prefetch stop signal 19 is "0" (invalid), an output signal from the AND gate 67 becomes "1". This means an output signal from the AND gate 67 becomes "1" only when a next instruction fetch is requested from the execution stage 35 by the fetch request signal 57, an operand prefetch is requested from the operand calculation stage 33 by the prefetch request signal 51, and a prefetch stop request is not issued from the operand access unit 1 by the prefetch stop signal 19.

An output signal from the AND gate 67 controls the gates 62, 64 and 66 as well as AND gates 96 and 97 stated later.

The AND gates 69 is of two inputs and whereto signals from the latch 95 and an inverter 99 are given. The inverter 99 is provided to invert the branch prediction signal 53 outputted from the operand address calculation stage 33. Therefore, an output signal from the AND gate 69 becomes "1" when the prefetch stop signal 19 is "1" and the branch prediction signal 53 is "0". This means that an output signal from the AND gate 69 becomes "1" only when prefetch from the operand access unit 1 by the prefetch stop signal 19 is requested to be stopped and it is informed that branch prediction is not performed from the operand address calculation stage 33 by the branch prediction signal 53. An output signal from the AND gate 69 becomes control signal of the above stated gate 65.

An output signal from the AND gate 67 is inputted to one input terminal of each of the AND gates 96 and 97. A signal obtained by inverting the branch prediction signal 53 by the inverter 98 is inputted to the other input terminal of the AND gate 96. The branch prediction signal 53 is inputted intact to the other input terminal of the AND gate 97. An output signal from the AND gate 96 is outputted to the operand access unit 1 as the first prefetch request signal 7 and an output signal from the AND gate 97 is outputted to the same as the second prefetch request signal 8. In the case were an output signal from the AND gate 67 is "1", when a branch prediction is performed in the operand address calculation stage 33 (the branch prediction signal 53 is "1"), the first prefetch request signal 7 is outputted to the operand access unit 1, and when a branch prediction is not performed (the branch prediction signal 53 is "0"), the second prefetch request signal 8 is outputted to the same.

Next, operation of the fetch retry mechanism of the above configuration is explained with reference to the timing chart of FIG. 12. Assuming that the prefetch stop signal 19 is invalid ("0") at first.

Figure 12:
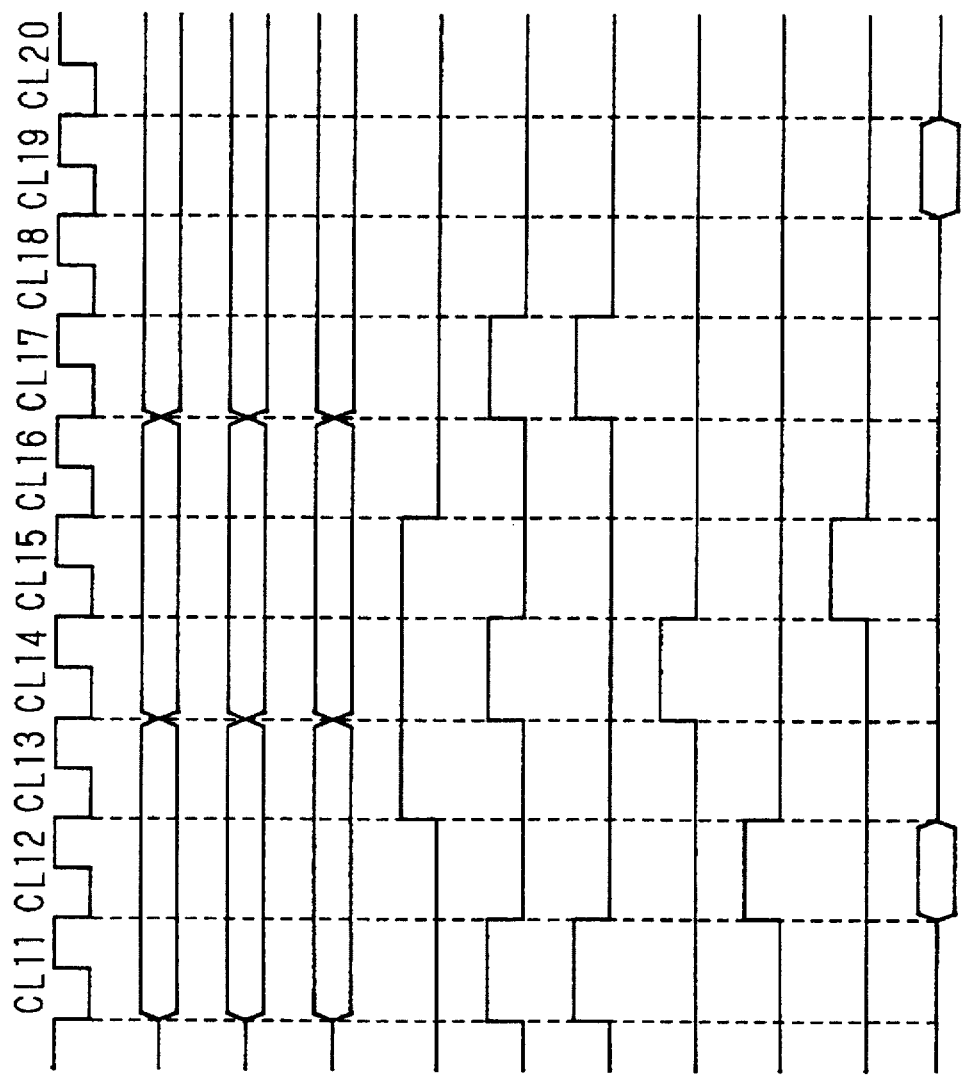
FIG. 12 is a timing chart showing an operation of the fetch retry mechanism of the data processor of the present invention.

In the timing chart shown in FIG. 12, waveform W11 indicates an internal clock of the data processor related to the present invention, waveform W12 indicates an address on the internal address bus 6, waveform W13 indicates tag information outputted from the tag unit 2, waveform W14 indicates data outputted from the data unit 3, waveform W15 indicates the cache hit signal 11, waveform W16 indicates the prefetch request signal 51, waveform W17 indicates the first prefetch request signal 7, waveform W18 indicates the second prefetch request signal 8, waveform W19 indicates the cache hit signal 11, waveform W20 indicates the prefetch stop signal 19, waveform W21 indicates data on the internal data bus 14.

In the clock CL11 in FIG. 12, when the prefetch request signal 51 is inputted to the operand fetch stage 34 from the operand address calculation stage 33 together with the operand address 52, a value of the operand address 52 is inputted to the FA register 61A and held in it.

At this time, in the case where the fetch request signal 57 is outputted from the execution stage 35 (the signal value is "1"), the gate 64 is open because an output signal from the AND gate 67 is "1". For this reason, the operand address 52 is outputted to the internal address bus 6 and given to the operand access unit 1. At the same time, the prefetch request signal 51 is also outputted to the operand access unit 1. At this moment, unless a branch prediction is performed by the preceding instruction in the pipeline, the first prefetch request signal 7 is outputted because the branch prediction signal 53 is "0". On the other hand, when a branch prediction is performed by the preceding instruction in the pipeline, the second prefetch request signal 8 is outputted because the branch prediction signal 53 is "1".

Unless fetch request signal 57 is given from the execution stage 35 at the moment when the prefetch request signal 51 is inputted from the operand address calculation stage 33, the gate 64 is not open. Therefore the operand address 52 is not outputted to the internal address bus 6 but held in the FA register 61A. When the fetch request signal 57 is outputted from the execution stage 35, an output signal from the AND gate 67 because "1" and the gate 66 is open. Therefore the operand address 52 is outputted to the internal address bus 6 as the fetch address from the FA register 61A, and at the same time, unless a branch prediction is performed by the preceding instruction in the pipeline, the branch prediction signal 53 is "0"; therefore the first prefetch request signal 7 is outputted to the operand access unit 1.

When a branch prediction is performed by a preceding instruction in the pipeline (the branch prediction signal 53 is "1") and an address to be fetched is specified by an immediate value, the address value does not dynamically change during an execution of a program. Since the address is explicitly specified by the programmer, it is surely considered that an accessible area is indicated. In such a case, there is no problem when branch prediction is wrong and an external unit is accessed, therefore the first prefetch request signal 7 is outputted and the second prefetch request signal 8 is not outputted.

When the first prefetch request signal 7 or the second prefetch request signal 8 is accepted by the operand access unit 1 and the acknowledge signal 55 is sent back, the gate 63 is open. Then, an address value to be accessed, that is, the operand address 52 held in the FA register 61A is inputted to the FB register 61B and held in it, so the FA register 61A can fetch the operand address 52 of the next instruction.

As shown in FIG. 3, when the first prefetch request signal 7 or the second prefetch request signal 8 is inputted and data to be fetched exists in the cache memory, the operand access unit 1 outputs the cache hit signal 11 as a cache hit in the clock CL12 and outputs the corresponding data from data output register 10 to the internal data bus 14. The operand fetch stage 34 sends data on the internal data bus 14 to the execution stage 35. At the time of generation of the first prefetch request signal 7, the built-in cache memory is accessed and at the same time a fetch request is sent to the bus interface unit 13. When a cache miss occurs, the operand data is fetched from the external data bus 16 and sent to the calculation unit 25. When cache is hit, the external fetch is canceled by the cache hit signal 11.

In addition, when the same operations as above are performed in the clocks CL14 and CL15 and then a cache miss occurs at the moment of generation of the second prefetch request signal 8 is issued, the prefetch stop signal 19 is outputted from the AND gate 76 in the clock CL15 to inform the operand fetch stage 34 that a cache miss has occurred.

When the prefetch stop signal 19 is inputted, the operand fetch stage 34 stops inputting from the operand address calculation stage 33 and aborts processing until a branch instruction at the prediction stage in a preceding stage in the pipeline is assured. Thereafter, when the branch condition is assured in the execution stage 35 and a branch takes place as predicted, the fetch request signal 57 is outputted from the execution stage 35 in the clock CL17 and the processing resumes. Since the branch prediction signal 53 becomes "0" at this moment, the first prefetch request signal 7 is outputted.

At the time when the processing is aborted by the output of the prefetch stop signal 19 above stated, an operand address of the next instruction is probably inputted to the FA register 61A, therefore the latch 95 is not cleared at the first step of the processing resumption and the branch prediction signal 53 is "0" and so the gate 65 is open. Thus, the fetch address of aborted fetch held in the FB register 61B is outputted to the internal address bus 6. Immediately after it, a value of the latch 95 is cleared.

When a branch is not taken as predicted, all of the data in the pipeline is cleared and instructions whereto branches are taken place are fetched to the pipeline in sequence to resume the processing.

Figure 13:
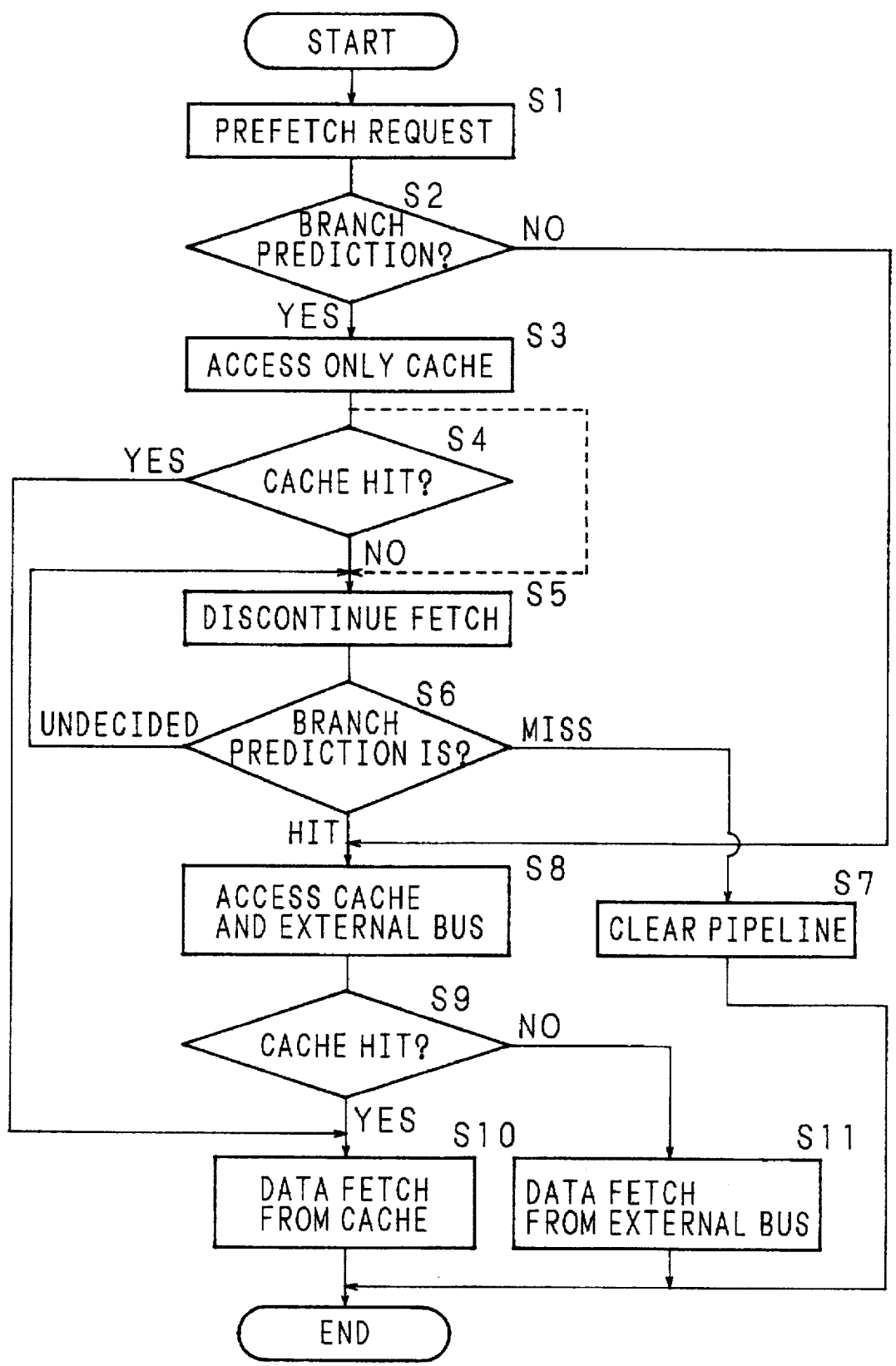
FIG. 13 is a flowchart showing an operation procedure in regard of operand fetch of the data processor of the present invention.

Operand fetch operations by a microprocessor as an embodiment of the data processor related to the present invention are shown by a flowchart of FIG. 13. It shows operations performed in response to a prefetch request outputted from the operand address calculation stage 33.

At first, the prefetch request signal 51 is outputted from the operand address calculation stage 33 (step S1), when a branch prediction is not performed at this moment, that is, the branch prediction signal 53 is "0", operation from step S8 to step S11 are performed. The operation from step S8 to step S11 are ordinary memory fetch operations.

Concretely, when the cache memory in the operand access unit 1 and the external data bus 16 are accessed (step S8) and the cache hit occurs, that is, the cache hit signal 11 is "1", the cache memory in the operand access unit 1 is accessed and data is fetched (step S10). When a cache miss occurs, that is, cache hit signal 11 is "0", the external data bus 16 is accessed and data is fetched (step S11).

On the other hand, when a branch prediction is performed in step S2, that is, the branch prediction signal 53 is "1", only the cache memory in the operand access unit 1 is accessed (step S3). As a result, when the cache hit occurs (step S4), data is fetched from the cache memory in the operand access unit 1 (step S10).

When a cache miss occurs in step S4, operand fetch is once aborted (step S5). At this moment, in the case where the result of the branch prediction is not yet determined, it comes into fetch-aborting state (step S5). However, when branch prediction is proved to be correct, operations subsequent to step S8 stated above are performed. In addition, when it is incorrect, each stage in the pipeline is cleared and an instruction whereto a branch takes place is fetched to the pipeline.

In a conventional microprocessor, when a branch prediction is performed in step S2 as shown by a broken line in FIG. 13, it comes into a fetch-abort state (step S5), and after the branch prediction is proved to be correct, a memory fetch operation of step S8 to step S11 is performed. However, in the microprocessor of the data processor related to the present invention, an operation of step S3 and step S4 is added, and so when the cache is hit in step S4, fetch-abort step of S5 and step of S6 are avoided and memory fetch of step S10 is immediately performed, and only when a cache miss has occurred in step S4, external bus access is suppressed, and then it is accessed again after the branch prediction is determined to be correct.

The above stated series of operation is realized by the abovementioned fetch retry mechanism whereby processing capability is improved in a data processor related to the present invention.

Data fetch is described in the above embodiment. It goes without saying that instruction fetch can be performed in a similar manner.

As described above, a cache memory operates as a built-in cache memory or a built-in RAM by switching means in the first invention of the present invention. Therefore system performance can be improved by proper selection according to applications where data processors related to the present invention are used. Bus snoop function also functions when it operates as the built-in cache memory.

When a branch is predicted, accessing to an external storage is inhibited by the second invention. At the moment when a branch prediction is proved to be correct and an external storage can be accessed, accessing is immediately performed by an address held in address holding means. Consequently, when a cache miss has occurred under a condition where a branch is predicted, that is, external storage needs to be accessed, processing is aborted. Therefore the cache memory can be used efficiently.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalents of such meets and bounds thereof are therefore intended to be embraced by the claims.

What is claimed is:

1. A data processor comprising:

an external storage which stores instructions and data;

an external address bus which outputs the address of the instruction or data stored in said external storage;

an external data bus;

an bus interface unit which accesses said external data bus by outputting a bus access control signal, said external data bus inputs/outputs instruction or data to/from said external storage when said bus access control signal is outputted and an address is outputted to said external address bus;

an internal storage which stores all or part of instructions or data stored in said external storage; and a pipeline processing mechanism having branch predicting means for predicting a branch destination when a branch instruction is processed;

further comprising:

data reading means for, when reading the next instruction or data, reading said next instruction or data from said internal storage when said next instruction or data is stored in said internal storage, and reading said next instruction or data by making said bus interface unit access said external storage when said next instruction or data is not stored in said internal storage;

control signal generating means for generating a control signal which becomes the first value when said branch predicting means does not predict a branch destination, and becomes the second value when said branch predicting means predicts a branch destination; and read inhibiting means for inhibiting said data reading means from making said bus interface unit access said external storage when said control signal is the second value.

2. A data processor as set forth in claim 1, wherein said control signal generating means determines the value of said control signal according to whether the instruction or data to be read next is in a predetermined addressing mode or not.

3. A data processor, comprising:

an external storage which stores instructions and data;

an external address bus which outputs the address of the instruction or data stored in said external storage;

an external data bus;

a bus interface unit which accesses said external data bus by outputting a bus access control signal, said external data bus inputs/outputs instruction or data to/from said external storage when said bus access control signal is outputted and an address is outputted to said external address bus;

an internal storage which stores all or a part of instructions of data stored in said external storage; and a pipeline processing mechanism having branch predicting means for predicting a branch destination when a branch instruction is processed;

further comprising:

data reading means for, when reading the next instruction or data, reading said next instruction or data from said internal storage when said next instruction or data is stored in said internal storage, and reading said next instruction or data by making said bus interface unit access said external storage when said next instruction or data is not stored in said internal storage;

control signal generating means for generating a control signal which becomes the first value when said branch predicting means does not predict a branch destination, and becomes the second value when said branch predicting means predicts a branch destination;

read inhibiting means for inhibiting said data reading means from making said bus interface unit access said external storage when said control signal is the second value; and address holding means for holding an address to be accessed when access to said external storage is inhibited by said read inhibiting means;

wherein said data reading means reads an instruction or data again by an address stored in said address holding means when it is proved that said branch predicting means correctly predicts a branch destination.

4. A data processor as set forth in claim 3, wherein said control signal generating means determines the value of said control signal according to whether the instruction or data to be read next is in a predetermined addressing mode or not.

* * * * *